UNITED STATES PATENT OFFICE.

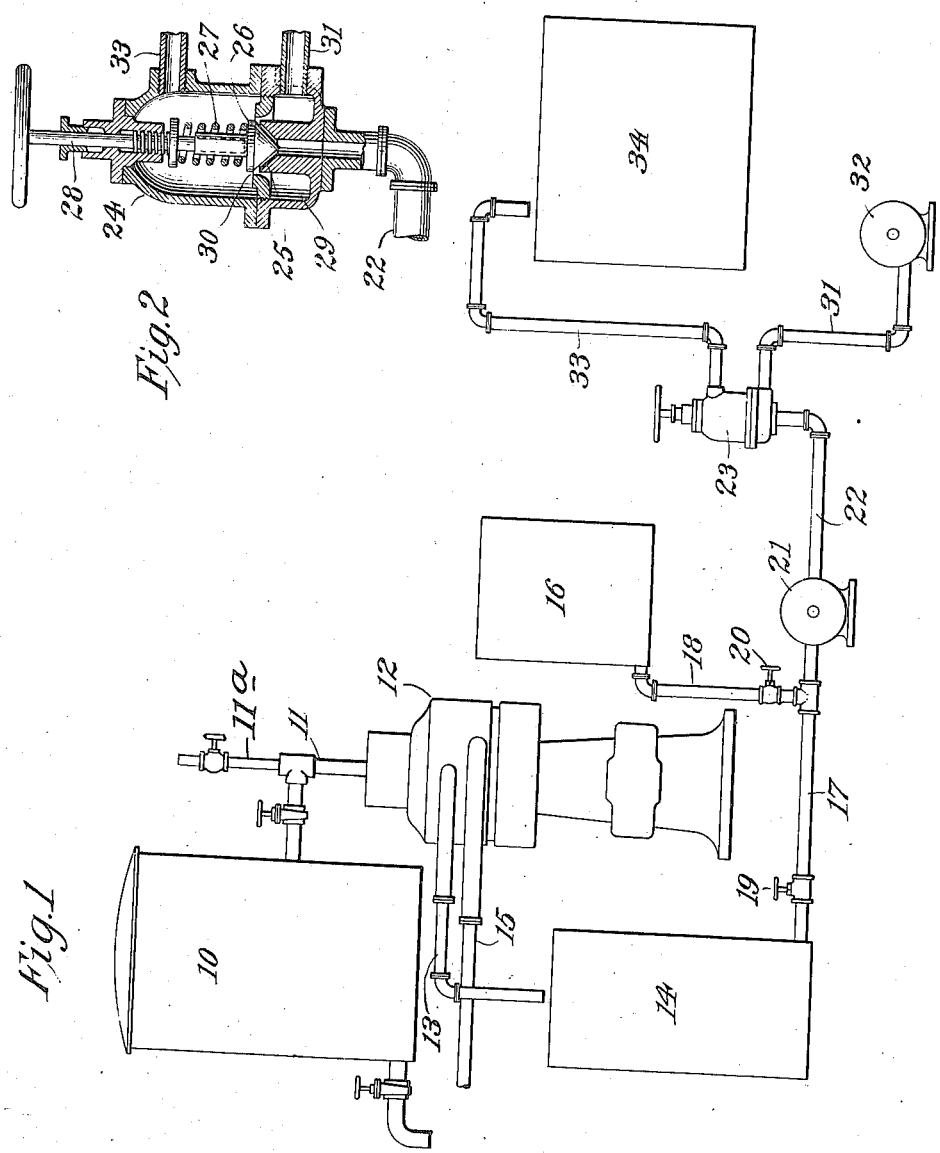

CHRISTIAN F. PAUL, JR., OF NEWARK, NEW JERSEY, ASSIGNOR TO THE SPALDING BY-PRODUCTS COMPANY, OF NEW HAVEN, CONNECTICUT, A CORPORATION OF CONNECTICUT.

TREATMENT OF ANIMAL AND VEGETABLE OILS, FATS, AND GREASES.

1,264,206.     Specification of Letters Patent.     Patented Apr. 30, 1918.

Application filed March 17, 1916, Serial No. 84,811. Renewed December 13, 1917. Serial No. 207,006.

*To all whom it may concern:*

Be it known that I, CHRISTIAN F. PAUL, Jr., a citizen of the United States, residing at Newark, in the county of Essex and State of New Jersey, have invented certain new and useful Improvements in the Treatment of Animal and Vegetable Oils, Fats, and Greases, of which the following is a full, clear, and exact description.

This invention relates to clarifying and bleaching fats, oils and other greases, particularly those derived from animal and vegetable sources, and its chief object is to provide an improved method and apparatus for the purpose, by which pure fats, oils, and greases can be obtained.

Simple and effective apparatus for practising my method is illustrated in the annexed drawing, in which—

Figure 1 shows the complete apparatus, diagrammatically.

Fig. 2 is a detail sectional view of the preferred type of mixer or emulsifier.

The invention can be used to treat all kinds of animal or vegetable greases, but for the sake of brevity the subjoined description of the preferred mode of practising the invention is confined to the treatment of greases derived by boiling or otherwise treating parts or carcasses of dead animals. It is to be understood that in the description and in the appended claims the word "grease" is used in a generic sense to include all organic fats, oils, and like substances.

The carcass or parts from which the grease is to be extracted are boiled with water in a suitable rendering tank or vessel 10, heated in any convenient manner, not shown, as for example by injecting live steam into the vessel. The grease is thus liquefied and collects on the surface of the water, mixed with much pulpy matter, fine hairs, dirt, and other foreign substances, and is drawn off through a valved pipe 11 and is delivered, together with hot water supplied from any suitable source (not shown) through a pipe 11ª, to a centrifugal "separator" 12. The grease is here separated from the "sludge" and is discharged through outlet pipe 13 into a collecting tank 14, while the waste matter or sludge is discharged through pipe 15 and may be used as fertilizer or for other purposes.

The tank 16 contains the reagent or reagents with which the grease is to be treated, as for example a bleaching liquor. Preferably the bleaching agent is an aqueous solution of an alkali peroxid, as $Na_2O_2$. In a solution of the latter, nascent oxygen is liberated, with the formation of sodium hydroxid (NaOH), or caustic soda. The two tanks are connected by means of pipes 17, 18, having valves 19, 20, to a suitable pump 21, by which the grease from tank 14 and bleaching agent from tank 16 are drawn off and more or less intimately mixed. By means of the valves 19, 20, the proper proportions of grease and bleaching agent can be regulated. It will of course be understood that the proportions depend upon various factors, such as the nature of the grease and the degree and nature of its discoloration, the strength or concentration of the bleaching liquor, etc., but can readily be determined by trial.

From the pump 21 the mixture is delivered by pipe 22 to an atomizer, or emulsifier and aerator, 23. The latter is preferably of the type shown in Fig. 2, comprising an upright casing 24 having in its lower portion a flaring inlet 25. Coöperating with the flaring inlet is a conical spreader 26, urged downwardly, toward the inlet, by a strong spring 27, which can be regulated by a screw-stem 28. Around the flaring inlet, but below the same, is an annular chamber 29 having an annular outlet 30 at the edge of the said flaring inlet. This chamber is connected by a pipe 31 to an air compressor 32. A discharge pipe 33 leads from the mixer or emulsifier to a vessel or tank 34.

The mingled grease and bleaching agent, delivered from the pump 21 under pressure, forces the spreader 26 slightly away from its seat 25 and issues from between the two in the form of a conical sheet of spray which, as it issues, is struck by the annular blast of air from the chamber 29. The particles composing the spray are thus further subdivided and thereby made very fine, so that the grease and the bleaching agent are brought into very intimate and close association. This insures effective action of the bleaching agent. At the same time the atomization of the mixture, combined with the air-blast, causes marked cooling effect, so that the material blown out of pipe 33 is thickened up, though capable of flowing slowly. This material is found to be thoroughly bleached, pure and white in color, and free from the objectionable odor that it had when it left the rendering tank. It will keep indefinitely without spoiling or deteriorating.

As before stated, sodium peroxid in water produces caustic soda. Being an alkali this saponifies a certain amount of the grease. Hence the material discharged from the mixer or emulsifier contains not only clarified and bleached grease but also some soap and, usually, some uncombined caustic soda. To get rid of the alkali, both combined and uncombined, the material, preferably without aging, is first heated slightly and then treated with a suitable acid (preferably sulfuric, free from iron), which combines with the sodium to form a water-soluble salt, as sodium sulfate, and liberates oxygen and hydrogen. The former gas, being in the nascent state, exerts further bleaching action on any unbleached matter present. The sodium sulfate or other soluble salt goes into solution in the water and hence separates out with the latter. This separation will occur naturally in time by letting the material stand in a suitable vessel or tank, or can be effected rapidly by means of a centrifugal separator. If desired, the treatment with sulfuric acid can be omitted and the material run through a separator at once, but in that case the liquor thus separated out may contain considerable dissolved soap as well as some caustic soda and more or less bleaching agent. For the purpose of utilizing the latter, sufficient fresh chemical is added to bring the liquor up to the proper strength, after which it can be re-used.

Though not essential, it is highly desirable that the grease from the rendering tank be separated as soon as possible from the water and other matters with which it is mixed, as I have found that immediate separation gives a greater yield of grease, of lighter color and less free fatty acid or acids.

It is to be understood that the invention is not limited to the specific procedure herein described but can be practised in other ways without departure from its spirit. For example, sulfuric or other suitable acid may be added directly to the sodium peroxid solution before mixing the latter with the grease. The formation of caustic soda is thus avoided, sodium sulfate being produced directly, with evolution of nascent oxygen, or such caustic as is formed is promptly neutralized by the acid. Saponification is thus eliminated or greatly diminished. On the other hand, any uncombined acid may attack the vessels, pipes and other fittings unless they are made of or interiorly coated with acid-resistant material.

The use of water, preferably hot (in the present case delivered through the pipe 11ª,) is not always essential; but in some cases it is highly advantageous. In general it enables more grease to be recovered from the crude material delivered to the separator.

I claim:

1. The method of treating grease for the purpose described, comprising emulsifying the grease and an aqueous solution of an alkali peroxid whereby the grease is finely divided and intimately mixed with the peroxid solution, treating the emulsion with a suitable acid to produce a water-soluble salt of the alkali, and separating the grease from the solution of such salt.

2. The method of treating grease for the purpose described, comprising emulsifying the grease and an aqueous solution of sodium peroxid, treating the emulsion with sulfuric acid to combine with the sodium and produce water-soluble sodium sulfate, and separating the grease from the sulfate solution.

3. The method of treating grease for the purpose described, comprising forcing the grease and an aqueous solution of sodium peroxid together under pressure through an atomizer whereby the grease and the solution are finely subdivided and intimately mixed, and simultaneously blowing air into the mixture; treating the mixture with a suitable acid to react with the sodium and produce a salt soluble in the water present; and separating the grease from the salt solution.

4. The method of treating grease for the purpose described, comprising forcing the grease and an aqueous solution of an alkali peroxid together through a narrow orifice and directing a jet of air under pressure upon the material issuing from the orifice, whereby the grease and the solution are finely divided and intimately mixed together, collecting the mixture in a suitable vessel, and treating it with an acid to neutralize the alkali and produce a salt soluble in the water present.

In testimony whereof I hereunto affix my signature.

CHRISTIAN F. PAUL, Jr.